United States Patent [19]

Ise et al.

[11] Patent Number: 4,596,509
[45] Date of Patent: Jun. 24, 1986

[54] APPARATUS FOR MOVING AND STOPPING TOOLS

[75] Inventors: Yoji Ise; Minoru Kato; Keiichi Tachikawa, all of Tokyo, Japan

[73] Assignee: Kabushiki Kaisha Myotoku, Tokyo, Japan

[21] Appl. No.: 622,651

[22] Filed: Jun. 20, 1984

[30] Foreign Application Priority Data

Aug. 29, 1983 [JP] Japan ............................... 58-157502
Sep. 22, 1983 [JP] Japan ............................... 58-175964

[51] Int. Cl.⁴ .............................................. B66C 1/00
[52] U.S. Cl. ..................... 414/749; 901/16; 901/23; 901/41
[58] Field of Search ............... 901/16, 23, 41; 414/732, 749, 750, 751, 752, 753, 744 R; 409/107, 109; 248/363

[56] References Cited

U.S. PATENT DOCUMENTS 3,365,161  1/1968  Deitch ........................... 248/363 X
4,177,002 12/1979  Motoda et al. .................. 901/16 X
4,229,641 10/1980  Ihara ............................. 901/16 X

FOREIGN PATENT DOCUMENTS 0137589 11/1977 Japan ................................. 901/16

*Primary Examiner*—Robert J. Spar
*Assistant Examiner*—D. Glenn Dayoan
*Attorney, Agent, or Firm*—Murray Schaffer

[57] ABSTRACT

A fixed ceiling is provided from which depends a carrier block which is movable forward, rearward, rightward and leftward. An exhaust port is provided on the upper surface of the carrier block and a seal member is provided on the surface of the carrier block about its periphery so that a vacuum can be created on the upper surface of the carrier block and the carrier block may be freely sucked to the fixed ceiling. Vertically movable fitting parts for a plurality of tools are provided below the carrier block.

1 Claim, 6 Drawing Figures

APPARATUS FOR MOVING AND STOPPING TOOLS

FIELD OF THE INVENTION

The present invention relates to apparatus for moving and regulating the position of work tools, workpieces and the like depending from a fixed ceiling.

BACKGROUND OF THE INVENTION

In various automated machines, factories and the like, it is necessary that tools, workpieces, or the like be arranged, depending, i.e., hanging from an elevated ceiling, so that they are movable into any selected position and stopped precisely at the point desired. Electric motors or fluid cylinders have been conventionally used for such purposes. However, in order to obtain movement in many directions, it is necessary to combine many motors or cylinders, giving rise to objection that such apparatus is thus very complicated and expensive.

Further, in the conventional apparatus, it is difficult to maintain a high load, in a perfectly stationary state and it is, therefore, necessary to increase the strength of the supporting members and to provide various accessories to overcome the load problems.

The present invention has as its object the elimination of such defects as are mentioned above and the provision of apparatus whereby first the tools can be accurately moved to any front, rear, right, left upper and lower positions; second, the tools can be fixed so as to endure high loads when stopped in predetermined positions; and third, to provide apparatus in which a pneumatic sliding system can be adopted if required.

SUMMARY OF THE INVENTION

According to the present invention, a fixed ceiling or elevated horizontal support, has mounted thereon a block movable, reciprocably, in a forward-rearward and leftward-rightward direction. An inflatable sealing member is arranged on the block about its peripheral edge and in proximity to the lower surface of the fixed ceiling, so that on inflation, it is made to closely contact the lower surface of the fixed ceiling and thereby pneumatically seal the space between the fixed ceiling and the surface of the block. Air is withdrawn from this space to produce a vacuum, causing the ceiling and block to directly abut and prevent any relative movement. Fittings for various tool are mounted on the block so as to be movable up and down relative thereto.

The objects and advantages of the present invention will become clear from the following description and drawings.

DETAILED DESCRIPTION OF THE INVENTION

Figure 1:
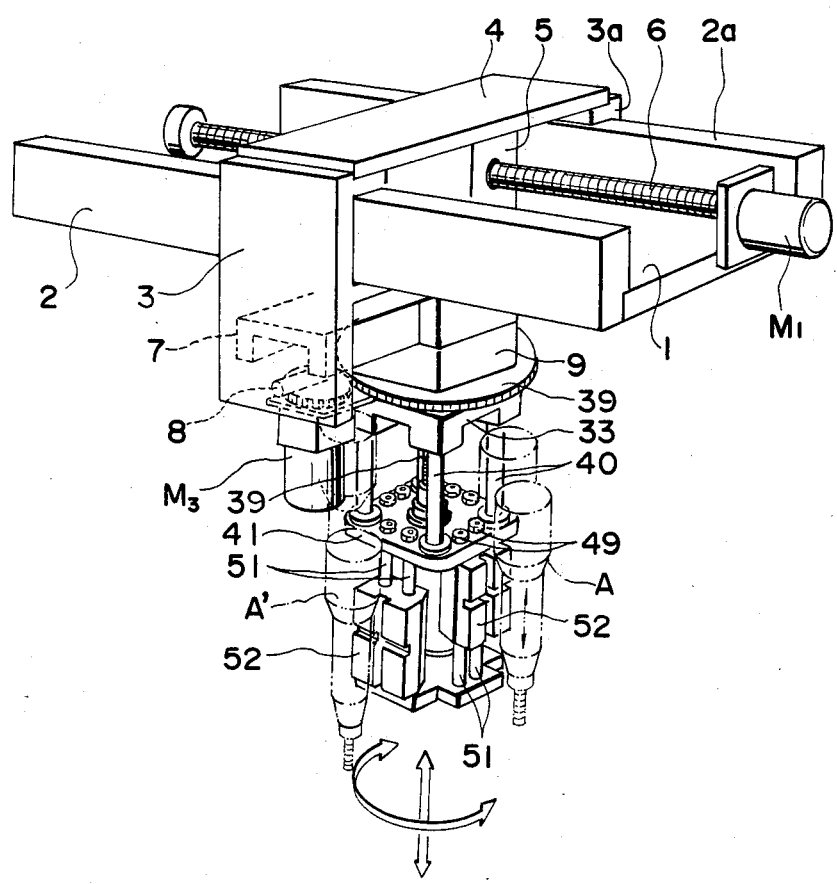
FIG. 1 is a general perspective view of the present invention as seen from above.
Figure 2:
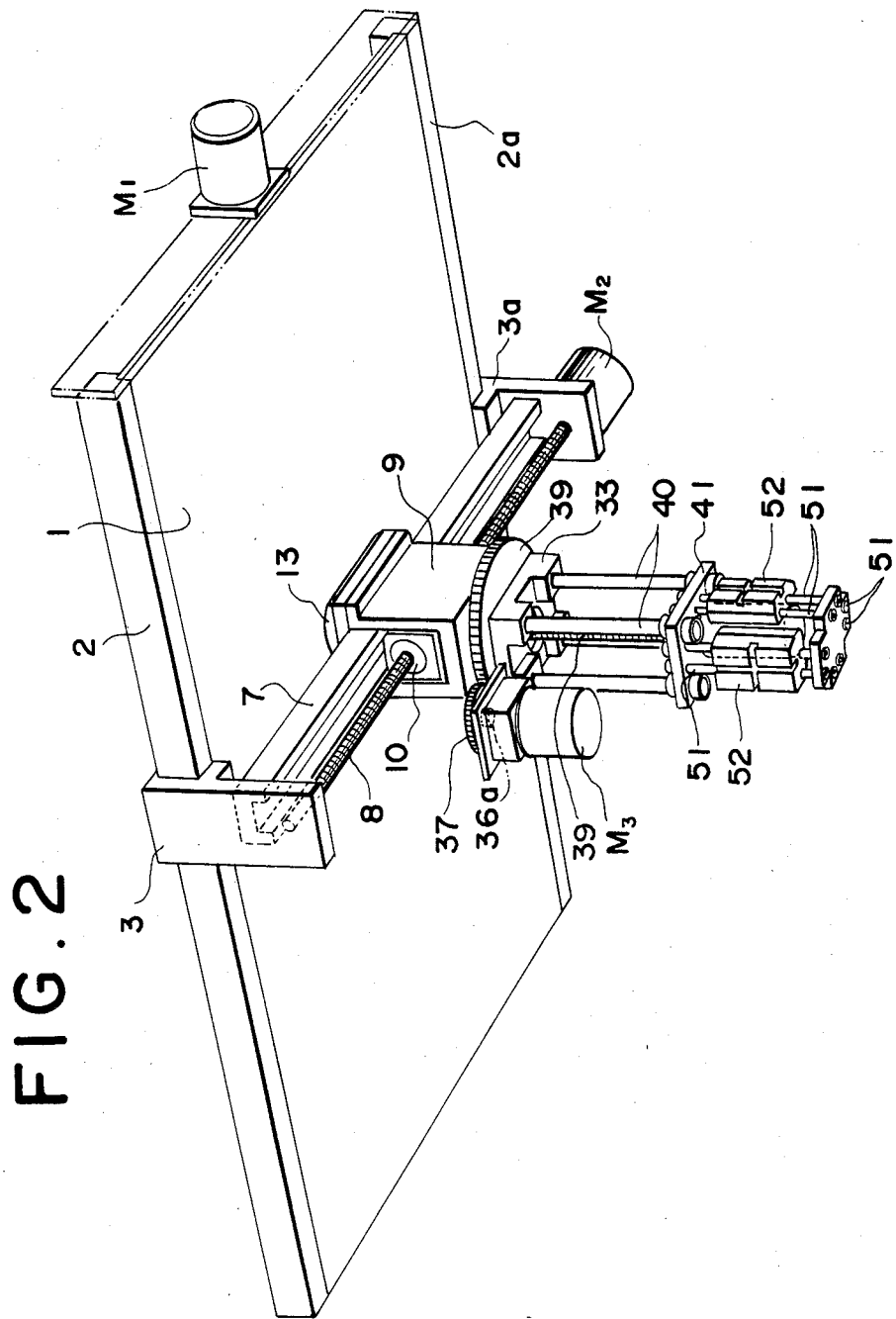
FIG. 2 is a general perspective view of the present invention as seen from below.

As shown in FIGS. 1 and 2, the present invention is provided with a fixed ceiling 1, having a flat smooth lower surface and supported at a predetermined level above the floor. Rigid, unflexible guide rails 2 and 2a extend along both of the longitudinal side edges of the ceiling 1. Fitted on each of the guide rails 2 and 2a are sliders 3 and 3a, respectively. The sliders 3 and 3a are so formed as to respectively fit over the outside surface and upper and lower surfaces of the associated guide rail 2 and 2a so as to be slidable along the guide rails. The upper parts of the sliders 3 and 3a are connected with each other through a connecting plate 4 extending transversely of and above the fixed ceiling 1 so as to be movable with the sliders 3 and 3a.

In the embodiment illustrated in the drawings, a ball nut 5 is secured to the underside of the connecting plate 4. A screw rod 6 extending through ball nut 5 is supported together with a drive motor $M_1$ at its forward end on the transverse end wall of the ceiling. When the screw rod 6 is rotated by the motor $M_1$, the connecting plate 4 and sliders 3 and 3a will be conjointly moved. A transverse guide rail 7, arranged below the ceiling 1, is secured at each of its ends to a downward extension of the sliders 3 and 3a respectively. Extending parallel to the guide rail 7 is a screw rod 8 which passes through a carriage block 9, reciprocably movable along the guide rail 7.

In the embodiment illustrated, the guide rail 7 is formed as a channel having a U-shaped cross-section, and the screw rod 8 is rotatably supported below the channel. A drive motor $M_2$ for rotating the screw rod 8 is provided on the downward extension of slider 3a at one end of the screw rod 8.

The details of the carriage block 9 are shown in FIGS. 3, 4, 5 and 6. The block 9 is formed of an upper plate 9a positioned on the upper surface of the guide rail 7, side plates 9b and 9c depending therefrom along the side walls of the guide rail and a bottom plate 9d secured to both side plates 9b and 9c below the screw rod 8. A ball nut 10 through which the screw rod 8 passes is mounted within the carriage block 9. The ball nut 10 is provided with a depending post 10a which is slidably fit within a hole 11 made in the bottom plate 9d of the block 9. In this manner the ball nut 10 is keyed to the block 9 so that the block 9 is movable vertically, up and down, with respect to the screw rod 8 and ball nut 10 but integral with them, for conjoint movement along the guide rail 7 on rotation of the screw rod 8.

Figure 3:
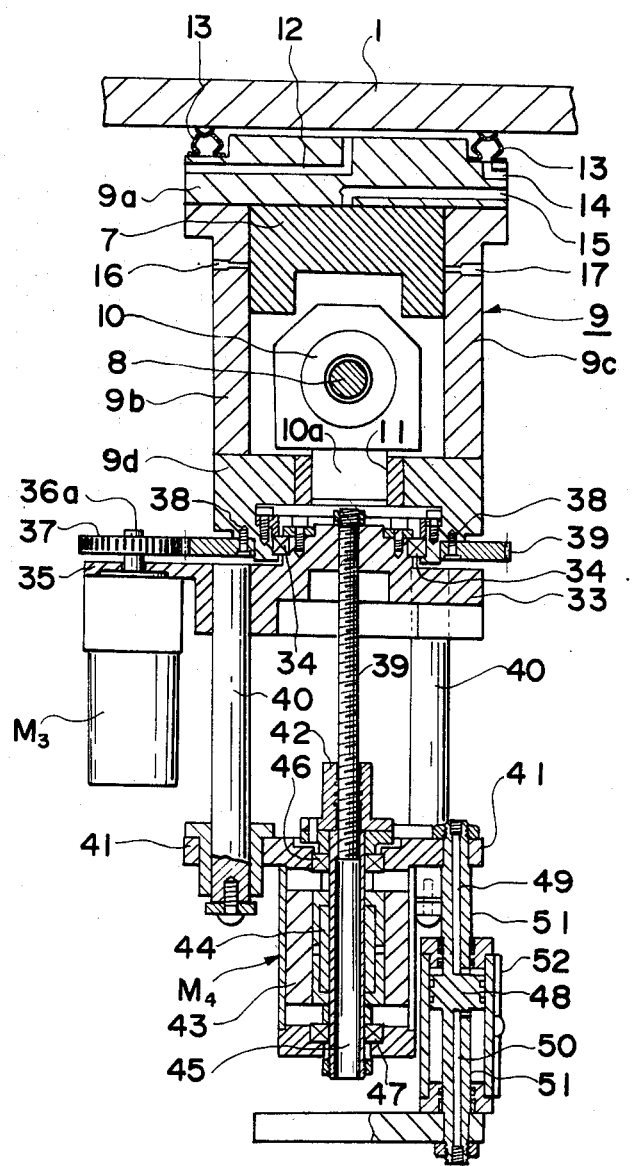
FIG. 3 is a vertically sectioned view of an essential part.
Figure 4:
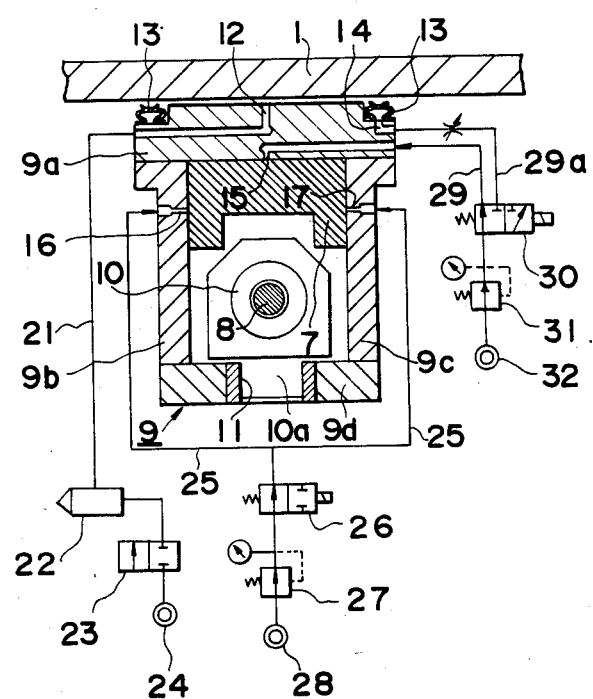
FIGS. 4-6 are sectioned views respectively showing operating states of a moving block.

An air exhaust port 12 is provided in the upper plate 9a of the block 9 through which air may be sucked from between block 9 and the lower surface of the ceiling 1. A flexible expandable sealing member 13 is secured to the upper plate 9a, about its periphery, in opposition to the lower surface of the fixed ceiling 1. The sealing member 13, shaped like a tire or slit tubular member, is normally collapsed and contracted away from contact with the ceiling (FIG. 4). However, when air under pressure is supplied to the inside of the tubular from the seal becomes inflated and makes sealing contact with the surface of the ceiling 1 (FIG. 3).

An air inlet port 14 extends through the upper plate 9a to feed air to the sealing member 13. Instead of a pneumatically operated tubular seal, a mechanical actuator may be used to expand and collapse the sealing member 13 releative to the fixed ceiling 1.

Further, as shown in FIGS. 3, 4, 5 and 6, air inlet jets 15, 16 and 17 are provided through the upper plate 9a and side plates 9b and 9c respectively so as to permit the feeding of compressed air, to form an air film between the opposing surfaces of the guide rail 7 and moving block 9 so that non-contact sliding of block 9 is effected and frictional resistance is reduced. Although not shown, the same air cushioning formation can be applied also between the guide rails 2 and 2a and sliders 3 and 3a, by providing air inlet jet ports on the respective surfaces of the sliders 3 and 3a opposed to the outside surfaces and upper and lower surfaces of the guide rails 2 and 2a.

Connected to the air exhaust port 12 is vacuum hose 21 leading from an ejector turbo-pump 22, as a vacuum source, to which compressed air, regulated by a valve 23 is supplied from a source 24 such as a compressor. Compressed air is fed to the inlet jets 16 and 17, via an air hose 25, a switch valve 26, a regulator 27 and compressed air source 28. Air under pressure is fed to the inlet jet 15 and the inlet port 14 (to the seal 13) via air hoses 29 and 29a, respectively, which lead from a switching valve 30, a regulator 31 and a compressed air source 32.

As seen in FIGS. 1-3, the vertically reciprocable tool parts are mounted to depend from a rotatable plate 33 below the moving block 9. The rotatable plate 33 is supported through a bearing 34 located between it and the moving block 9. A motor $M_3$ is mounted on an arm 35 radially extending from the side of rotatable plate 33 side. The shaft 36 of the motor 34 carries a gear 37 which meshes with a gear 39 fixed by bolts 38 to the bottom plate 9d of moving block 9. Therefore, when the motor $M_3$ is driven, the rotatable plate 33 will be rotated by a corresponding angle.

A screw rod 39 is fixed to depend through the central part of the rotatable plate 33, and a plurality of guide rods 40 are provided about the plate 33 parallel to the screw rod 39. A supporting plate 41 through which the screw rod 39 extends is provided to slide up and down along the guide rods 40. A nut 42, rotated by a motor $M_4$ threaded on the screw rod 39 is supported on the supporting plate 41. The stator 43 of the motor $M_4$ is fixedly attached to the housing of the motor $M_4$ which is supported below the supporting plate 41. The central rotor 44 has a hollow drive shaft 45 so that the screw rod 39 may be inserted into it. The drive shaft 45 is further rotatably supported relative to the suppoting plate 41 and the stationary stator 43 by bearings 46 and 47. The nut 42 threaded on to the rod 39 is fixed to the upper end of the drive shaft 45 for conjoint rotation. Therefore, when the rotor 44 of the motor $M_4$ is rotated, the nut 42 will be simultaneously rotated and the supporting plate 41 will slide vertically along the screw rod 39 and guide rods 40.

A selected member of piston and cylinder actuators are mounted to depend from the supporting plate 41. Each of these actuators comprises a piston 48 from which extends in opposite vertical directions a pair of piston rods 51, each having through holes 49 and 50 opening respectively at their outer and inner ends, surrounding the piston 48 and enclosing the inner ends of the holes 49 and 50 is a cylinder 52. The outer end of the upper piston rod 51 is secured in the supporting plate 41 and the cylinder 52 is free to be vertically movably, relative to the piston 48 and both piston rods 51. That is, the cylinder 52 moves up or down by feeding air through either or both the through holes 50 or 49 at the lower outer end or upper outer end of the piston rods 51.

In the embodiment shown in FIGS. 1 and 2, two piston rods 51 are provided with a single integrally formed cylinder 52, but even one piston rod may do to actuate movement of an associated cylinder. The outside surface of the cylinder 52 is constructed to be a tool fitting, on which a tool "A" such as a drill (shown in phantom) may be secured. Although the details are not shown in the drawings, the fixture for the tool "A" is provided in advance on the exterior surface of the cylinder 52, so that the tool may be easily placed in position.

In operation, the described moving block 9 may be shifted to any position by the motors $M_1$ and $M_2$, i.e., the block 9 is moved rightward and leftward by rotating the screw rod 6 with the motor $M_1$ and forward and rearward by rotating the screw rod 8 with the motor $M_2$. In either case, compressed air will be simultaneously jetted through the above mentioned respective air inlet jet ports 15, 16 and 17 to provide an air cushion allowing the sliders 3 and 3a and block 9 to move in a noncontacting state.

Figure 5:
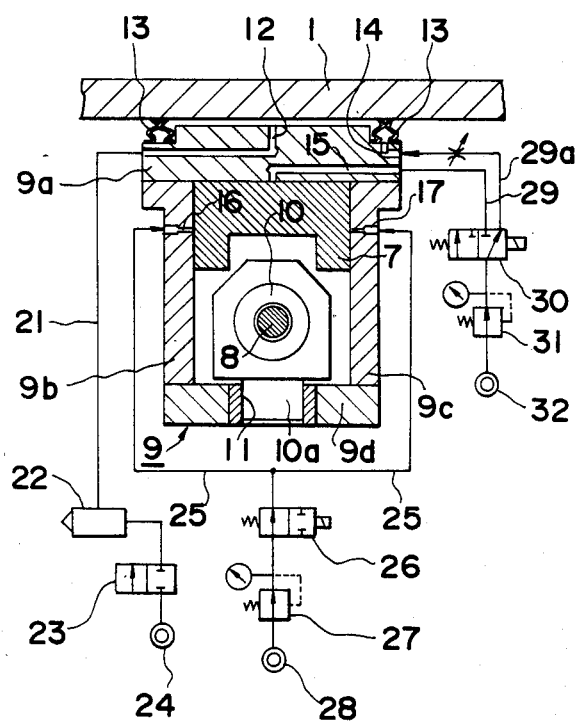
Figure 6:
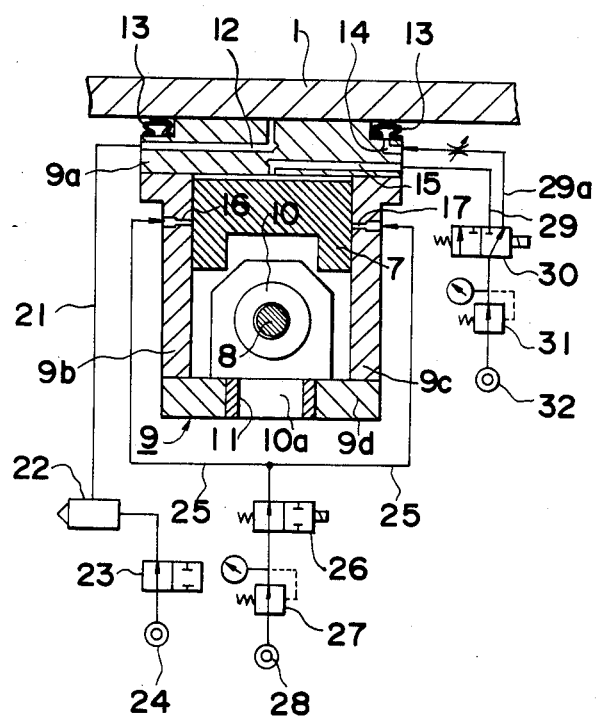

To arrest the moving block 9 once it has been moved to a predetermined position, and place it into a perfect stop condition, the compressed air being fed into the ports 15, 16 and 17 is discontinued and the moving block 9 allowed to rest on and be supported by the guide rail 7. Then, as shown in FIG. 5, the switching valve 30 is switched to feed compressed air through the air inlet port 14 into the sealing member 13, via the air feeding hose 29a. As a result, the sealing member 13 will be inflated to closely contact at its upper edge the lower surface of the fixed ceiling 1. After confirmation, that a proper seal has been made, compressed air is fed to the ejector pump 22 from the compressed air source 24 to create a vacuum by which air is removed from between the upper surface of the moving block 9 and the lower surface of ceiling 1, enclosed by the sealing member 13. The air is withdrawn through the vacuum hose 21 via the exhaust port 12. As a result, the space above the upper surface of the moving block 9 enclosed by the sealing member 13 will be subjected to a vacuum and finally, as shown in FIG. 6, the moving block 9 will rise to the fixed ceiling 1 and will closely contact the lower surface of the ceiling 1 and be fixed thereto.

Thereafter, the exact position of the tool "A" can be selected by operation of the motor $M_3$ and moved up and down by the vertical movements of the motor $M_4$ and cylinder 52.

By the way, while one tool "A" is being used, another tool "A" may be placed in position by the cylinder 52. Consequently, a plurality of tools "A" and "A'", etc. can be simultaneously operated.

When the block 9 is to be released from the closely contacting fixation with the ceiling 1, the air feed to the ejector pump 22 from the compressed air source 24 is stopped, and the upper surface of the block 9, enclosed by the sealing member is opened to the atmosphere through the air vacuum hose 21. Further, the feeding of compressed air to the sealing member 13 is stopped and the block 9 will lower under its own weight and will return to the state shown in FIG. 4, being then free to move.

It will thus be observed that the present invention provides effects wherein the moving block can be perfectly fixed to the lower surface of the fixed ceiling; is perfectly controlled in the forward and rearward as well as rightward and leftward movements; is regulated by the fixed ceiling in its vertical movement; and can maintain a highly precise position, without being disturbed even when a high load is applied to the tools. The block is easily moveably, i.e., slid with its frictional coefficient reduced by the non-contact air cushioning system and is easily controllable with small high precision motors, which improve the durability and produce no mechanical noise.

While the present invention has been described as being useful in positioning tools, it may be easily adapted to move and position the workpiece, or the like.

We claim:

1. Apparatus for moving and stopping tools mounted on a carrier suspended from a fixed ceiling member, comprising guide rails provided on opposite sides of said fixed ceiling, slide members respectively mounted over and movable along each of said first guide rails, said slide members being connected with each other above the fixed ceiling member so as to be conjointly movable, a second guide rail connecting said slide members below said fixed ceiling member, a carrier block mounted on said second guide rail for up and down movement and sliding therealong, said carrier block having an upper surface and a depending portion encompassing at least in part said second guide rail, a rotatable screw rod for moving said block along said second guide rail, an air exhaust hole opening on the upper surface of said movable carrier block, and a seal member provided about the periphery of the upper surface of said movable block adapted to contact the surface of said ceiling member, and at least one tool fitting member adjustably mounted on the depending portion of said movable carrier block to which said tools are attached.

* * * * *